(12) United States Patent
Miyashiro

(10) Patent No.: US 9,169,070 B2
(45) Date of Patent: Oct. 27, 2015

(54) SYSTEM AND APPARATUS FOR HANDLING DEPOSIT BEVERAGE CONTAINERS

(71) Applicant: Thomas H. Miyashiro, Honolulu, HI (US)

(72) Inventor: Thomas H. Miyashiro, Honolulu, HI (US)

( * ) Notice: Subject to any disclaimer, the term of this patent is extended or adjusted under 35 U.S.C. 154(b) by 0 days.

(21) Appl. No.: 14/585,076

(22) Filed: Dec. 29, 2014

(65) Prior Publication Data

US 2015/0114793 A1    Apr. 30, 2015

Related U.S. Application Data

(63) Continuation-in-part of application No. 13/767,552, filed on Feb. 14, 2013, now Pat. No. 8,919,521.

(51) Int. Cl.
| | |
|---|---|
| B65G 11/08 | (2006.01) |
| B65G 11/20 | (2006.01) |
| G06M 7/00 | (2006.01) |
| G06M 7/02 | (2006.01) |
| G06M 7/04 | (2006.01) |
| G07F 7/06 | (2006.01) |
| B07C 7/00 | (2006.01) |

(52) U.S. Cl.
CPC ............... *B65G 11/203* (2013.01); *B07C 7/00* (2013.01); *G06M 7/02* (2013.01); *G06M 7/04* (2013.01); *G07F 7/0609* (2013.01)

(58) Field of Classification Search
USPC .......... 198/382, 396; 209/522, 524, 655, 656, 209/658, 659, 660, 910; 221/177, 181, 183
See application file for complete search history.

(56) References Cited

U.S. PATENT DOCUMENTS

| | | | | | |
|---|---|---|---|---|---|
| 2,530,419 | A | * | 11/1950 | Bourland ...................... | 198/446 |
| 2,632,588 | A | * | 3/1953 | Hoar, Jr .......................... | 53/501 |
| 4,328,887 | A | * | 5/1982 | Beard! et al. ................. | 198/396 |
| 4,395,625 | A | * | 7/1983 | Schutt .......................... | 235/98 C |
| 4,469,215 | A | * | 9/1984 | Buer et al. .................... | 198/382 |
| 4,674,677 | A | * | 6/1987 | Trautwein .................... | 232/43.3 |
| 4,731,802 | A | * | 3/1988 | Magnusson et al. ............. | 377/6 |
| 5,072,100 | A | * | 12/1991 | McClusky et al. .......... | 235/98 R |
| 5,473,703 | A | * | 12/1995 | Smith .......................... | 382/143 |
| 5,671,262 | A | * | 9/1997 | Boyer et al. ..................... | 377/11 |
| 6,050,485 | A | * | 4/2000 | Brito ........................... | 235/91 R |
| 6,053,302 | A | * | 4/2000 | Leu et al. .................... | 198/471.1 |
| 6,497,339 | B1 | * | 12/2002 | Geltser et al. .................... | 221/13 |
| 7,225,913 | B2 | * | 6/2007 | Okuyama et al. ............. | 198/396 |
| 7,340,084 | B2 | * | 3/2008 | Hamid .......................... | 382/141 |
| 7,854,375 | B2 | * | 12/2010 | Miyashiro ................... | 235/91 R |
| 8,417,375 | B2 | * | 4/2013 | Horev et al. .................. | 700/230 |
| 8,798,789 | B2 | * | 8/2014 | Horev et al. .................. | 700/236 |
| 8,919,521 | B2 | * | 12/2014 | Miyashiro ..................... | 193/2 D |

\* cited by examiner

*Primary Examiner* — Douglas Hess
(74) *Attorney, Agent, or Firm* — Kunzler Law Group

(57) ABSTRACT

A system including a load assembly configured to hold a plurality of deposit beverage containers, a tray configured to receive the deposit beverage containers from the load assembly, and one or both of a sort bar and a chute be disposed on the tray. The sort bar is configured to stop individual deposit beverage containers from sliding across the tray long enough to allow a user to sort individual deposit beverage containers and the chute is configured to direct the deposit beverage containers in a path across the tray. The system further includes a feed channel that receives the deposit beverage containers from the tray, with the feed channel being coupleable to one or both of the following components: a count module configured to receive and count the containers from the feed channel and a holding module configured to receive and hold the containers from the feed channel.

20 Claims, 14 Drawing Sheets

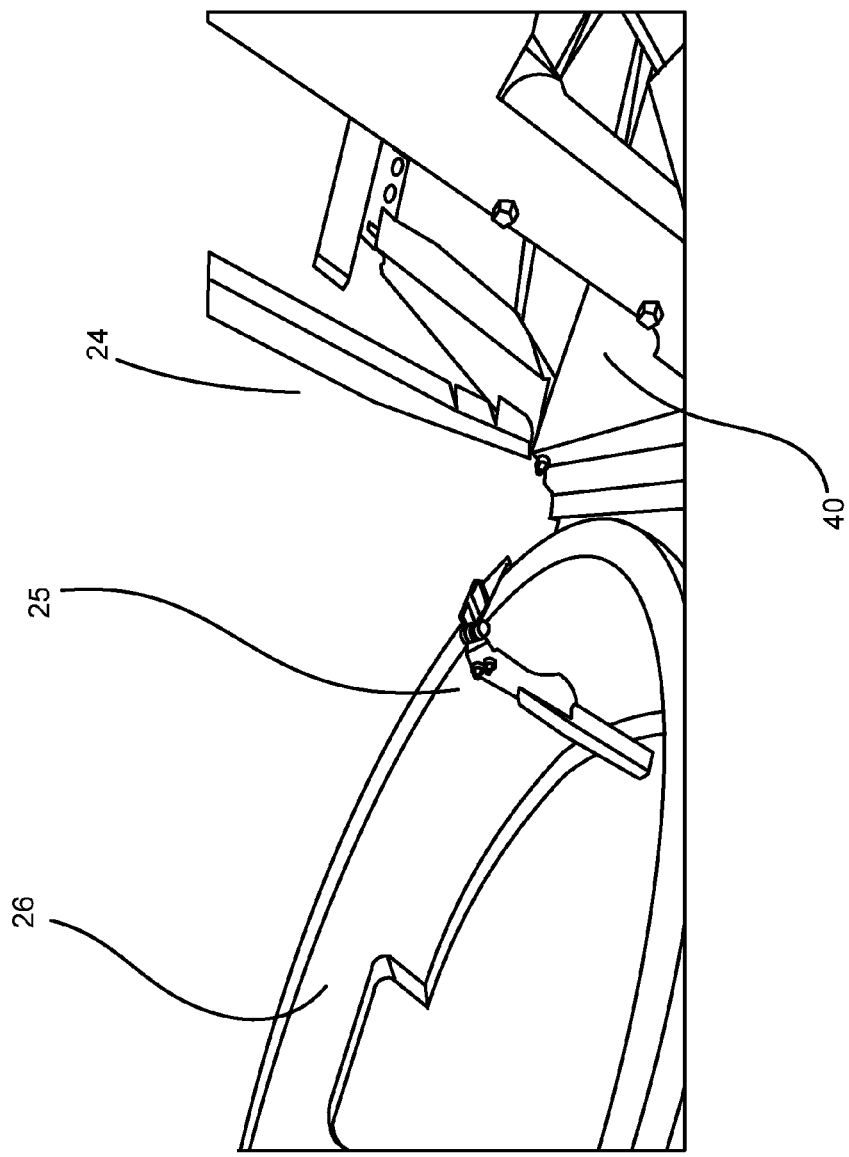

SYSTEM AND APPARATUS FOR HANDLING DEPOSIT BEVERAGE CONTAINERS

CROSS-REFERENCES TO RELATED APPLICATIONS

This is a continuation-in-part application of and claims priority to U.S. patent application Ser. No. 13/767,552 filed on Feb. 14, 2013 for Thomas H. Miyashiro, which is incorporated herein by reference.

FIELD

The field of the invention relates generally to container handling devices, and more specifically to container handling systems for counting and/or sorting deposit beverage containers.

BACKGROUND

Certain types of beverage containers, such as bottles and cans, are made of recyclable materials such as aluminum, glass, or plastic. These containers can often be redeemed by consumers for money or other forms of compensation, wherein the redemption value is typically calculated on a per unit basis. Sometimes, the redemption value may be calculated by weight, but this method may result in inaccurate redemption values or require more work by consumers and redemption centers. For example, the presence of fluid in containers would increase the overall weight and redemption value of a collection of containers beyond their actual redemption value. In addition, the redemption value of different materials of equal weight may differ, and thus require consumers or redemption centers to take the extra step of sorting containers by material composition (e.g., glass, plastic, metal) before they are weighed.

Calculating the redemption value of containers on a per unit basis avoids these aforementioned issues but comes with its own set of issues. Manual counting of containers is time-consuming and labor-intensive. Furthermore, counting containers by hand, especially large quantities, is prone to errors. Some redemption centers tell their customers they don't need to pre-sort the containers, thus offering to sort the containers for the customer. Conventional sorting usually involves dumping the containers on the ground and then the worker has to grasp each container and toss it into a bin. This is called floor sorting, and requires the worker to work in bent over or crouching positions. Such sorting procedures are generally slow, inefficient, inaccurate, and physically taxing on the worker.

SUMMARY

From the foregoing discussion, it should be apparent that a need exists for an apparatus, system, and method that handle deposit beverage containers in an efficient manner. The subject matter of the present application has been developed in response to the present state of the art, and in particular, in response to the problems and needs in the art that have not yet been fully solved by currently available systems. Accordingly, the present disclosure has been developed to provide an apparatus and system that overcome many or all of the above-discussed shortcomings in the art.

Disclosed herein is one embodiment of a system for handling deposit beverage containers. The system includes a load assembly configured to hold a plurality of deposit beverage containers, the load assembly having an outlet end. The system also includes a tray configured to receive the deposit beverage containers from the outlet end of the load assembly. The system may be operated in various use-modes, including a sort-and-count mode and a count-only mode. In other words, one or both of a sort bar and a chute may be disposed on the tray. The sort bar is configured to stop individual deposit beverage containers from sliding across the tray long enough to allow a user to sort individual deposit beverage containers and the chute is configured to direct the deposit beverage containers in a path across the tray. The system further includes a feed channel that is disposed along a bottom edge of the tray and that is configured to receive the deposit beverage containers from the tray. The feed channel is coupleable to one or both of the following components: a count module configured to receive and count the deposit beverage containers from the feed channel and a holding module configured to receive and hold the deposit beverage containers from the feed channel.

According to one implementation, the system includes (not merely is coupleable to) the count module and the feed channel is directly coupled to the count module. In such an implementation, the sort bar and the chute may be detachably coupled to the tray, allowing the user to change the system between various use-modes. For example, the sort bar and the chute may be detachably coupled to the tray exclusive of each other, allowing the user to alternate the system between a sort-and-count mode (sort bar coupled to the tray) and a count-only mode (chute coupled to the tray). In such an implementation, when the system is in the count mode the chute is configured to direct the deposit beverage containers in an arcuate path across the tray to the count module, substantially bypassing the feed channel.

In another implementation, the feed channel includes a sloped end portion and the count module includes a choke opening that orders the deposit beverage containers into a single file row, an upward bend following the choke opening that has a decreased slope, when compared to the sloped end portion of the feed channel, to moderate the flow of the deposit beverage containers, and a downward curve following the upward bend that accelerates each deposit beverage container to create separation between the deposit beverage containers. After the downward curve there is a sensor that is configured to count the number of deposit beverage containers.

In one implementation, the system includes the holding module and the holding module is coupled to the feed channel when the system is in a sort-only mode. In one implementation, the load assembly includes a lift actuator that is controllable by a user to lift and lower the plurality of deposit beverage containers to upward dumping positions and to lower loading positions, respectively. Additionally, the tray may be positioned in an angled orientation with respect to the ground and the angled orientation may be selected by a user (i.e., varying angled orientations).

In another implementation, the tray is elevated a distance above the ground so as to allow a user easy access to the deposit beverage containers received from the load assembly. In another implementation, the feed channel includes a bottom panel having a V-shaped contact surface. The feed channel may include a bottom panel having a low-friction contact surface. The feed channel may include a bottom panel having a low-friction liner insert. Further, the feed channel may include a bottom panel having a plurality of protruding ribs, the protruding ribs being aligned with the longitudinal axis of the feed channel. In one implementation, the load assembly includes a vibrator that facilitates controlled delivery of deposit beverage containers from the load assembly to the tray.

According to another embodiment, disclosed herein is a system that includes a load assembly configured to hold a plurality of deposit beverage containers, the load assembly comprising an outlet end. The system also includes a tray configured to receive the deposit beverage containers from the outlet end of the load assembly, with the tray having one or both of the following components detachably coupled thereto: a sort bar configured to stop individual deposit beverage containers from sliding across the tray long enough to allow a user to sort individual deposit beverage containers and a chute configured to direct the deposit beverage containers in a path across the tray. The system also includes a feed channel configured to receive the deposit beverage containers from the tray, with the feed channel being disposed along a bottom edge of the tray. Still further, the system includes a count module coupled to an end of the feed channel and configured to receive and count the deposit beverage containers from the feed channel. According to one implementation, the system includes a second count module coupled to a second end of the feed channel.

In yet another embodiment, disclosed herein is a system for handling deposit beverage containers. The system includes a load assembly configured to hold a plurality of deposit beverage containers, the load assembly having an outlet end, a lift actuator that is controllable by a user to lift and lower the plurality of deposit beverage containers to one or more upward dumping positions and to one or more lower loading positions, respectively, and a vibrator. The system also includes a tray configured to receive the deposit beverage containers from the outlet end of the load assembly, with the tray being elevated a distance above the ground so as to allow a user easy access to the deposit beverage containers. Still further, the system includes a sort bar coupled to the tray and configured to stop individual deposit beverage containers from sliding across the tray long enough to allow the user to manually sort the individual deposit beverage containers and a feed channel configured to receive the deposit beverage containers from the tray, the feed channel disposed along a bottom edge of the tray, the feed channel having a bottom panel having a V-shaped contact surface. The system also includes a count module coupled to an end of the feed channel and configured to receive and count the deposit beverage containers from the feed channel.

According to one implementation, feed channel includes a sloped end portion, and the combination of the feed channel and count module includes a choke opening that orders the deposit beverage containers into a single file row, an upward bend following the choke opening that has a decreased slope, when compared to the sloped end portion of the feed channel, to moderate the flow of the deposit beverage containers, a downward curve following the upward bend that accelerates each deposit beverage container to create separation between the deposit beverage containers, and a sensor following the downward curve configured to count the number of deposit beverage containers.

Reference throughout this specification to features, advantages, or similar language does not imply that all of the features and advantages that may be realized with the present disclosure should be or are in any single embodiment of the invention. Rather, language referring to the features and advantages is understood to mean that a specific feature, advantage, or characteristic described in connection with an embodiment is included in at least one embodiment of the subject matter disclosed herein. Thus, discussion of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize that the subject matter of the present application may be practiced without one or more of the specific features or advantages of a particular embodiment. In other instances, additional features and advantages may be recognized in certain embodiments that may not be present in all embodiments of the disclosure. Further, in some instances, well-known structures, materials, or operations are not shown or described in detail to avoid obscuring aspects of the subject matter of the present disclosure. These features and advantages of the present disclosure will become more fully apparent from the following description and appended claims, or may be learned by the practice of the disclosure as set forth hereinafter.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the subject matter of the present application will be described and explained with additional specificity and detail through the use of the accompanying drawings, in which:

FIG. 3a is a close-up perspective side view of a loading basin of the counting apparatus of FIG. 1;

DETAILED DESCRIPTION

Figure 1:
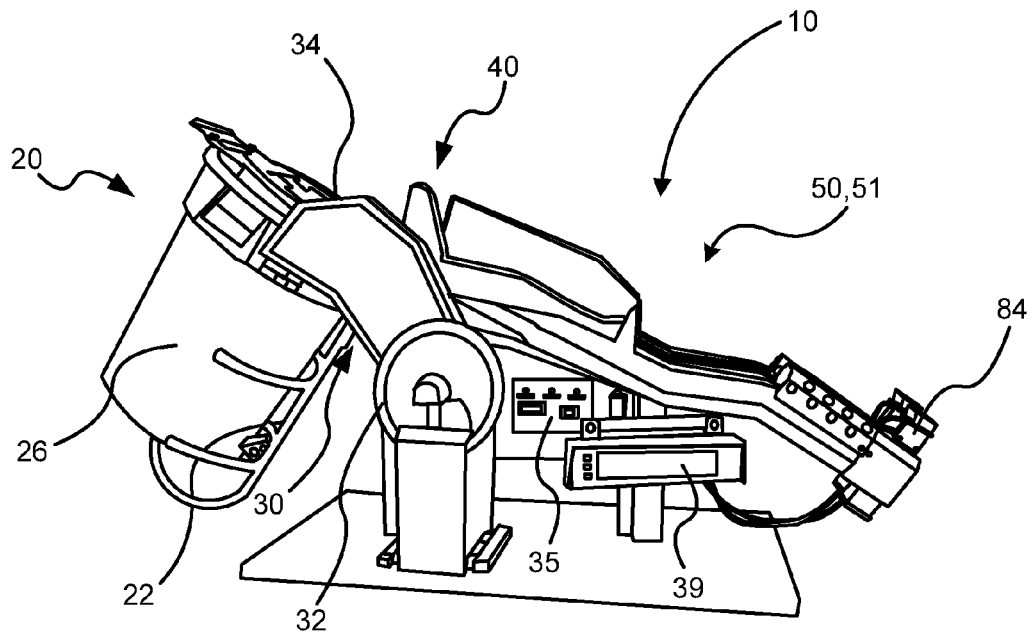
FIG. 1 is a side view of an apparatus for counting deposit beverage containers, in accordance with an embodiment of the present invention.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Furthermore, the described features, structures, or characteristics of the disclosure may be combined in any suitable manner in one or more embodiments. In the following description, numerous specific details are provided. One skilled in the relevant art will recognize, however, that the subject matter of the present application may be practiced without one or more of the specific details, or with other methods, components, materials, and so forth. In other instances, well-known structures, materials, or operations are not shown or described in detail to avoid obscuring aspects of the disclosure.

Illustrated in FIGS. 1-17 are several representative embodiments of an Apparatus for Counting Deposit Beverage Containers, which embodiments also include one or more methods of automatically counting deposit beverage containers. As described herein, the deposit container counting apparatus provides several significant advantages and benefits over devices and methods for counting deposit containers. However, the recited advantages are not meant to be limiting in any way, as one skilled in the art will appreciate that other advantages may also be realized upon practicing the present invention.

FIGS. 1-3a show an exemplary embodiment 10 of the deposit beverage container counting apparatus. The counting apparatus 10 includes a loading basin 20 for holding a plurality of deposit beverage containers to be counted by the counting apparatus, a feed chute 40 for merging the plurality of deposit containers received from the loading basin 20 into one or more rows 2 of deposit containers 4, and one or more feed channels 50 for receiving a row 2 of deposit containers 4, and conveying the deposit containers to a sensor assembly 84 which is used to sense the presence of a deposit container 4 in the feed channel 50 and to supply a signal to an electronic counting device in a control panel 35 which update the count and provides an updated signal to one or more output displays 39.

Figure 16:
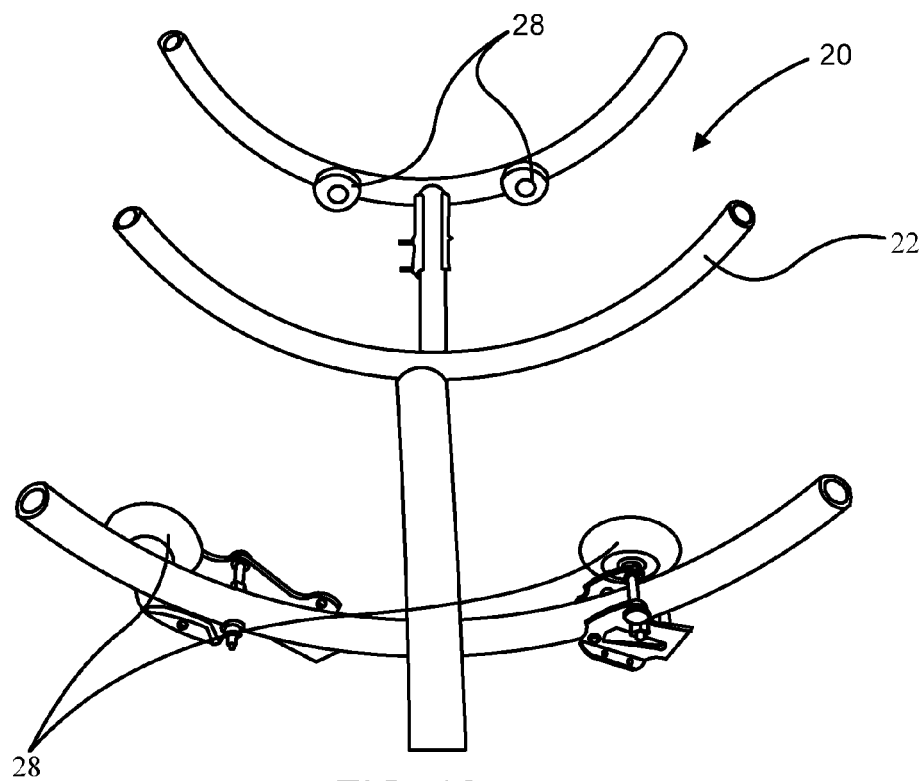
FIG. 16 is a back view of the load cradle located on the counting apparatus of FIG. 1.

In the embodiment shown, the loading basin 20 includes a cradle 22 which supports and lifts a removable bin 26 holding the deposit containers 4 to a position above the feed chute 40 and feed channel(s) 50, so that the deposit containers 4 fall out of the removable bin 26 and slide down the feed channel(s) 50 under the force of gravity. In some aspects the removable bin 26 can include the standard 32-gallon plastic barrels commonly used at redemption centers. The cradle 22 has wheels mounted transverse to the longitudinal centerline of the cradle, as shown in FIG. 16. These wheels allow easier and smooth rotation of the removable bin 26 within the cradle 22. The loading basin 20 also includes a retaining member 24 which fits into the opening of the removable bin 26 to prevent containers from falling out of the bin as the bin is raised, and to guide the deposit containers 4 into the feed chute 40 once the cradle 22 has been rotated to the upward position, as shown in FIGS. 2 and 3.

The loading basin 20 also includes an angled member 25, as shown in FIG. 3a, that is attached to the cradle and extends into the removable bin 26, and is oriented at an angle such that it obstructs the movement of containers moving with the rotating bin and forces these containers towards the top of the bin. Thus, the angled member 25 helps produce is a more evenly distributed flow of containers from the removable bin 26, reduces the likelihood of logjams in the feed chute 40, and results in higher average container flow rates. It is to be appreciated, however, that other configurations for the loading basin 20 are also possible, and that any mechanism for conveying a plurality of deposit containers to the feed chute 40, whether attached to the feed chute or separate, is considered to fall within the scope of the present invention.

Figure 2:
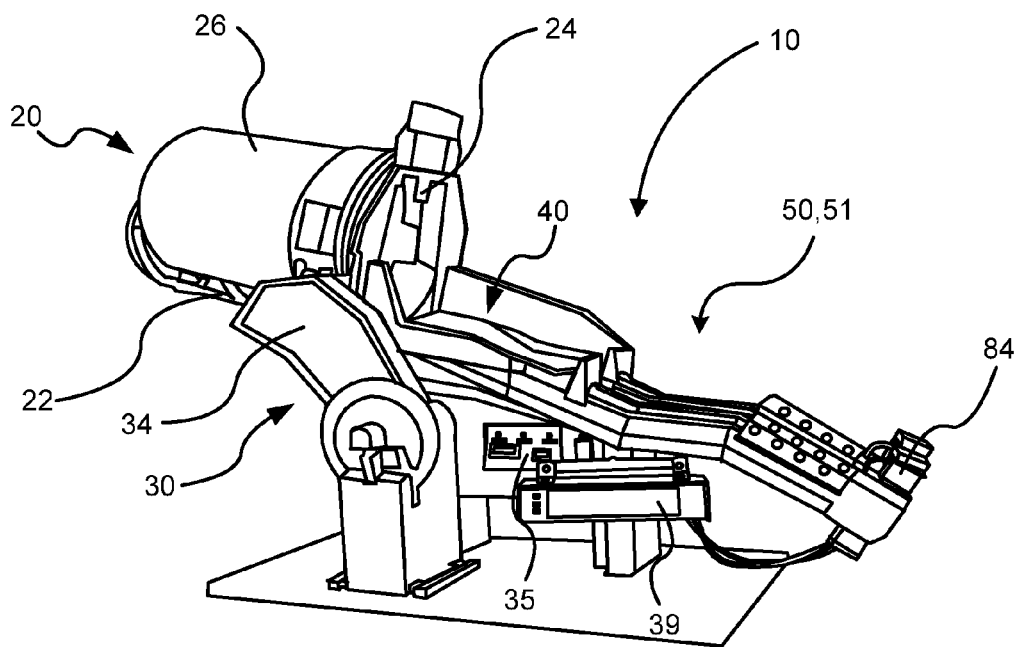
FIG. 2 is a perspective side view of the counting apparatus of FIG. 1 with a raised loading basin.
Figure 3:
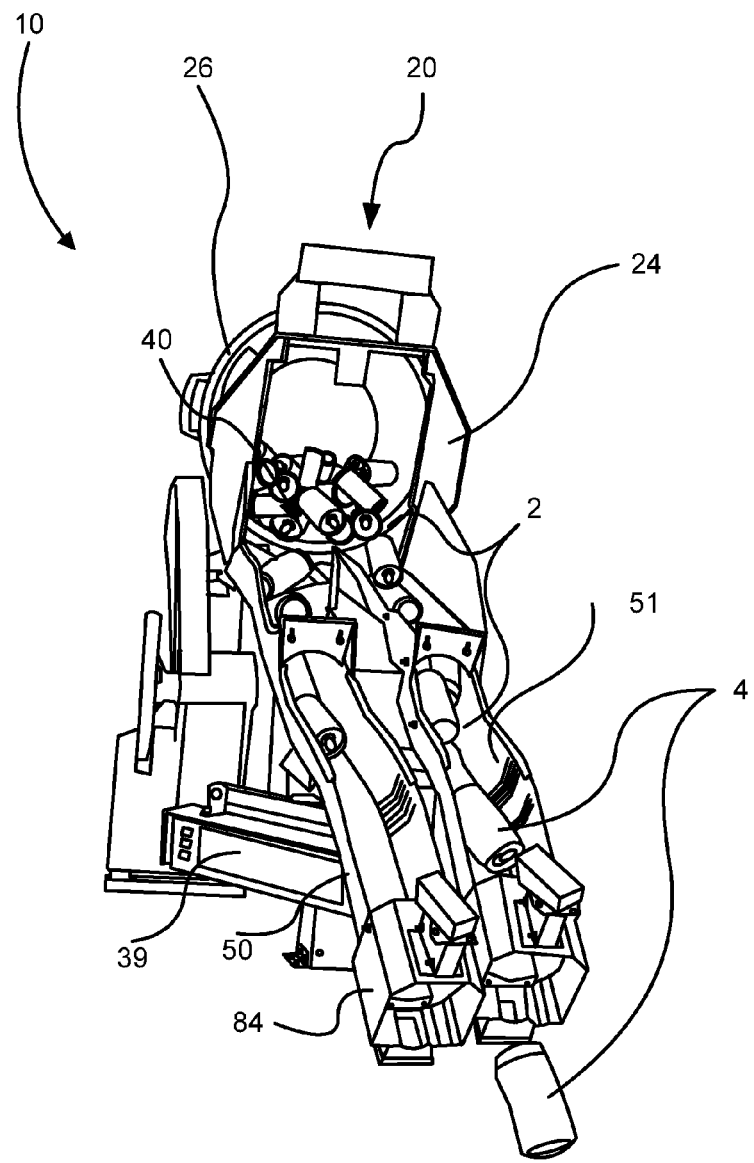
FIG. 3 is a perspective front view of the counting apparatus of FIG. 1 in operation.

A lift mechanism 30 can be used to rotate the cradle 22 to lift the removable bin 26 from its lowered loading position (FIG. 1) to its upward dumping position (FIGS. 2 and 3). In the embodiment shown, the lift mechanism 30 includes a hand wheel 32 which operates a transmission assembly located within the lift housing 34, such as a pulley, lever arm or gear, and which transmission assembly provides sufficient leverage force for rotating the cradle 22 and removable bin 26. The lift housing 34, furthermore, also contains a locking device which locks the cradle 22 into the upper position so that it does not accidently rotate down to the lowered position during operation of the counting apparatus (FIG. 3), as well as a braking device which gradually lowers the cradle 22 and removable bin 26 to the lowered position upon release of the locking device. As may be appreciated by one of skill in the art, the locking device and braking device can be combined into a single mechanism which performs both functions.

Also shown in FIGS. 1-3 is a control panel 35, which includes the electronic counting device that receives the electronic signals from the one or more sensor assemblies 84, updates the count of deposit containers 4 which have exited the counting apparatus 10, and outputs the updated count to one or more displays, such as the large display 39 having a size and orientation that is easily observable by a customer who's deposit cans are being counted.

Figure 4:
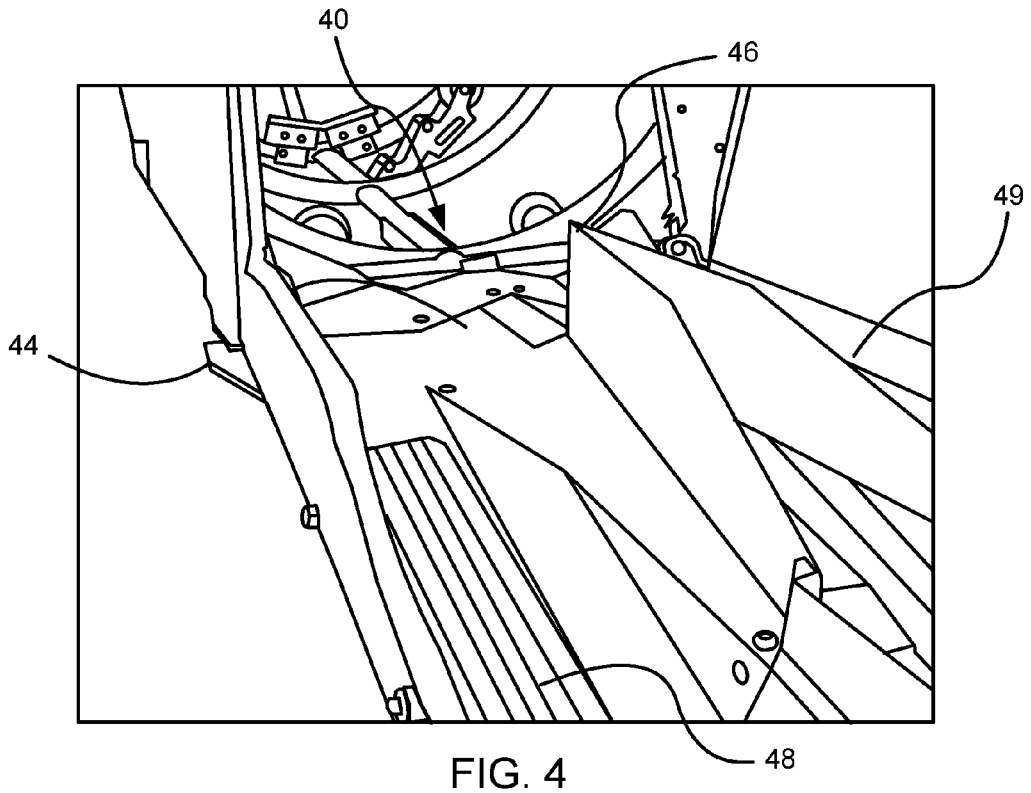
FIG. 4 is a close-up perspective from view of a feed chute of the counting apparatus of FIG. 1.
Figure 5:
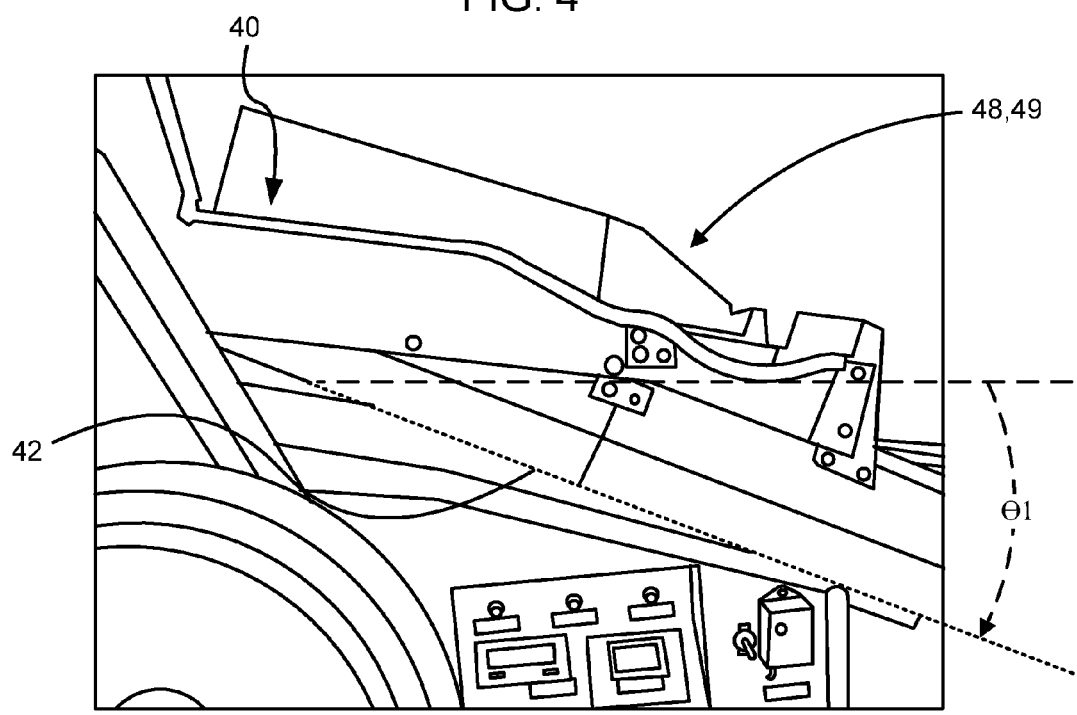
FIG. 5 is a close-up side view of the feed chute of FIG. 4.

The feed chute 40 is shown with more detail in FIGS. 4-5. The feed chute 40 includes an inlet end 44 and one or more outlet openings 48, 49 and is downwardly inclined from the inlet to the outlet opening(s) at a first slope 42 at a first slope angle $\theta 1$. The magnitude of the first slope angle $\theta 1$ determines how fast the containers clear out of the feed chute and move down the feed channels. In the representative embodiment shown in FIG. 5, the first slope angle $\theta 1$ can range from about fifteen degrees to about thirty degrees below horizontal, and is preferably between about twenty-five degrees to about twenty-eight degrees below horizontal. This high degree of inclination of the first slope 42 can operate to increase the break-away acceleration of the deposit containers away from the feed chute 40 as they enter the feed channels, which can both improve the deposit container through-put rate and minimize the incidence of jams at the choke plate, as described below.

As can be seen, the feed chute also narrows from the inlet end to the outlet opening(s) so that the plurality of deposit containers being dumped into the inlet end 44 from the loading basin are merged into one or more rows of deposit containers by the time they exit through the outlet openings 48,49 (see FIG. 3). If the counting apparatus includes multiple feed channels 50,51 such as the dual feed-channel embodiment shown in FIGS. 1-17, the feed chute 40 also includes a divider 46 which splits the flow of deposit containers into the two rows.

Figure 6:
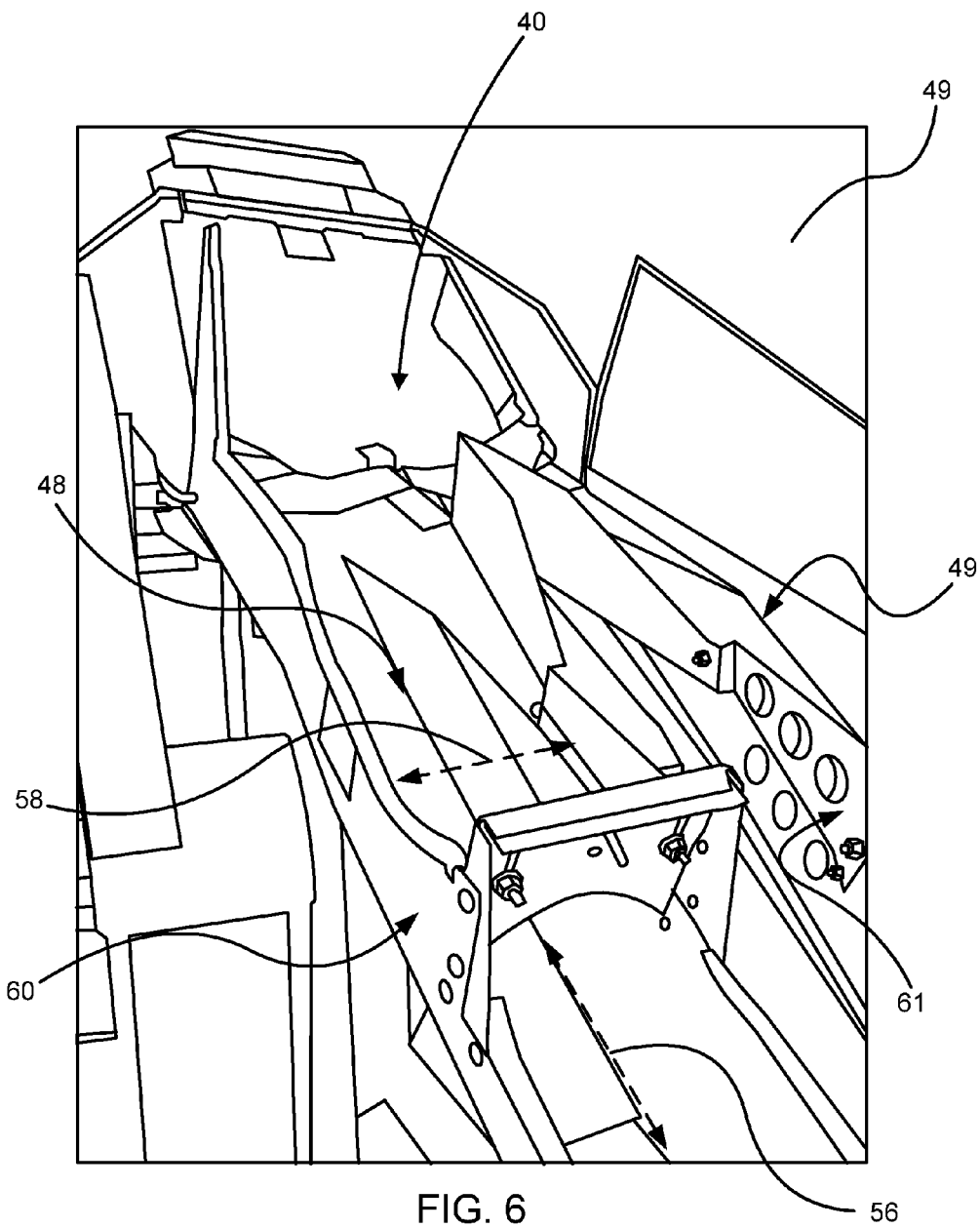
FIG. 6 is an expanded perspective front view of the feed chute and feed channels of the counting apparatus of FIG. 1.
Figure 7:
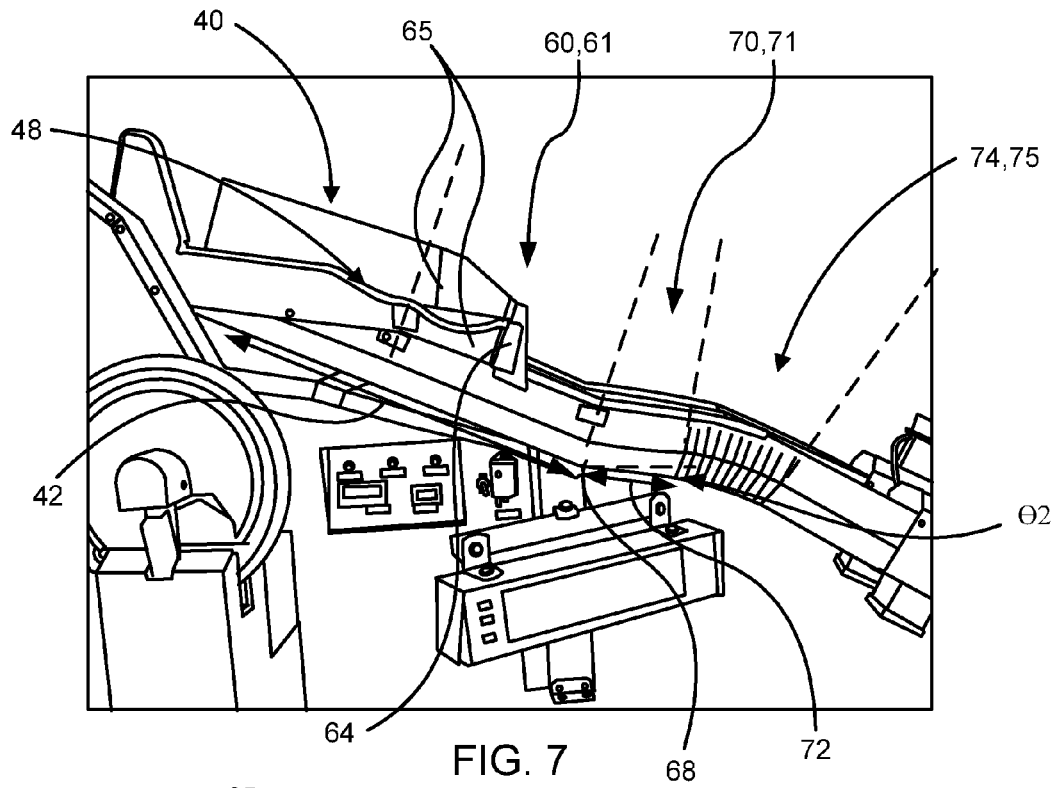
FIG. 7 is side view of the feed chute and feed channels of the counting apparatus of FIG. 1.
Figure 8:
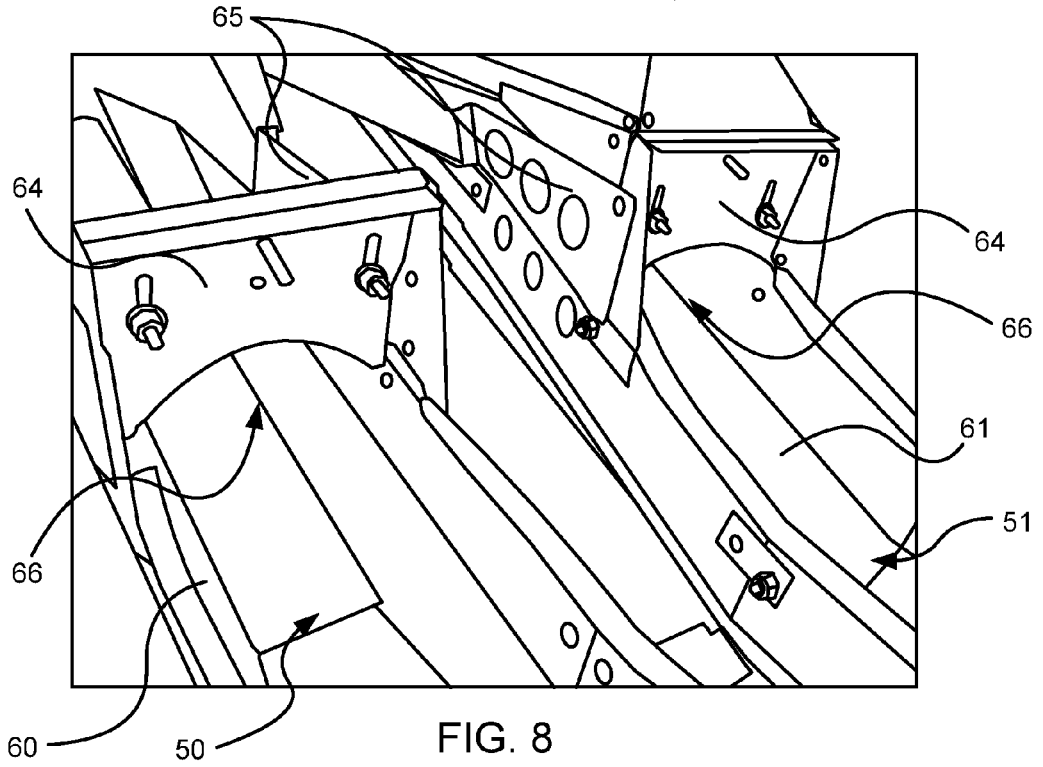
FIG. 8 is a close-up perspective view of the upper channel portion and choke plates of the feed channels of FIG. 7.

Referring now to FIGS. 6-8, the one or more outlet opening(s) 48,49 of the feed chute 40 can extend seamlessly into the upper channel portions 60,61 of the feed channels 50,51 at the point where the feed chute 40 narrows to the width 58 of the feed channels (FIG. 6). Furthermore, the upper channel portions 60,61 of the feed channels can also maintain the same downward slope 42 of the feed chute 40 until a first bend 68 in the feed channel is reached at the boundary between the upper channel portions 60,61 and middle channel portions 70,71 of the feed channels (FIG. 7). Extending the same downwardly angled slope 42 of the feed chute 40 through the upper channel portion 60 of the feed channel 50 operates to maintain the forward and downward movement of the deposit containers as they exit the feed chute and travel towards the choke opening 66. The choke opening 66 can be formed by the choke plate 64 which extends over the top of the upper channel portion 60 of the feed channel 50 (FIG. 8).

Because the deposit containers leaving the outlet opening 48,49 of the feed chute 40 can sometimes be angled sideways, bunched together or stacked on top of each other, the choke opening 66 operates to restrict and order the row of the deposit containers into a single file, one-at-a-time row of deposit containers having the long axis of each deposit container aligned with the longitudinal axis 56 of the feed channel 50,51. Moreover, as the misaligned deposit containers can tend to pile up against choke plate 64 and clog the feed channel 50,51 during counting operations, manual clearing of the clog may be required by the operator. Manual clearing of the clogs can be accomplished easily and safely as the counting apparatus operates entirely under the influence of gravity and there are no moving machinery or powered parts. Additional side plates 65 can be attached to the sidewalls of the feed channels 50,51 upstream of the choke opening 66 to extend the height of the sidewalls and prevent the deposit containers from spilling over the sides of the feed channels when a clog does occur.

Referring back to FIG. 7, the upper channel portions 60,61 of the feed channels 50,51 can end at the first bend 68, which can be an upward bend that decreases the downward angle of the middle channel portions 70,71 to a second downward slope 72 at a second slope angle θ2 that is less inclined than the first downward slope 42 of the feed chute 40 and upper channel portions 60,61 of the feed channels. The upward bend 68 can be a short-radius bend or a long-radius bend. In the representative embodiment shown in FIG. 7, the second slope angle θ2 can range from about zero degrees to about fifteen degrees below horizontal, and is preferably between about zero degrees to about five degrees below horizontal.

The reduced steepness of the second downward slope 72 serves to slow down and stabilize the flow of deposit containers and to keep them from becoming airborne at the transition channel portion 74,75 described below. In addition, when there are a large number of deposit containers traveling down the feed channel at the same time, the reduction in slope at the middle channel portions 70,71 can cause the deposit containers to contact each other end-to-end, thereby slowing any faster-traveling deposit containers down to the speed of the other deposit containers.

Thus, as the row of deposit containers approaches the final portion of the feed channel, namely the transition channel portions 74,75 and the lower channel portions 80,81, the deposit containers will have been merged into a one or more rows of deposit containers in the feed chute 40, ordered into single file and aligned in with the longitudinal axis of the feed channels 50,51 at the choke openings 66 of the upper channel portion 60,61, and then slowed in the middle channel portions 70,71 to ensure that the deposit containers do not enter the transition channel portions 74,75 with too great a velocity. When there is a large group of deposit containers traveling through the feed channel at the same time, moreover, the deposit containers are abutted end-to-end in the middle channel portions 70,71 so that each container approaches the transition channel portions 74,75 at approximately the same speed.

Figure 9:
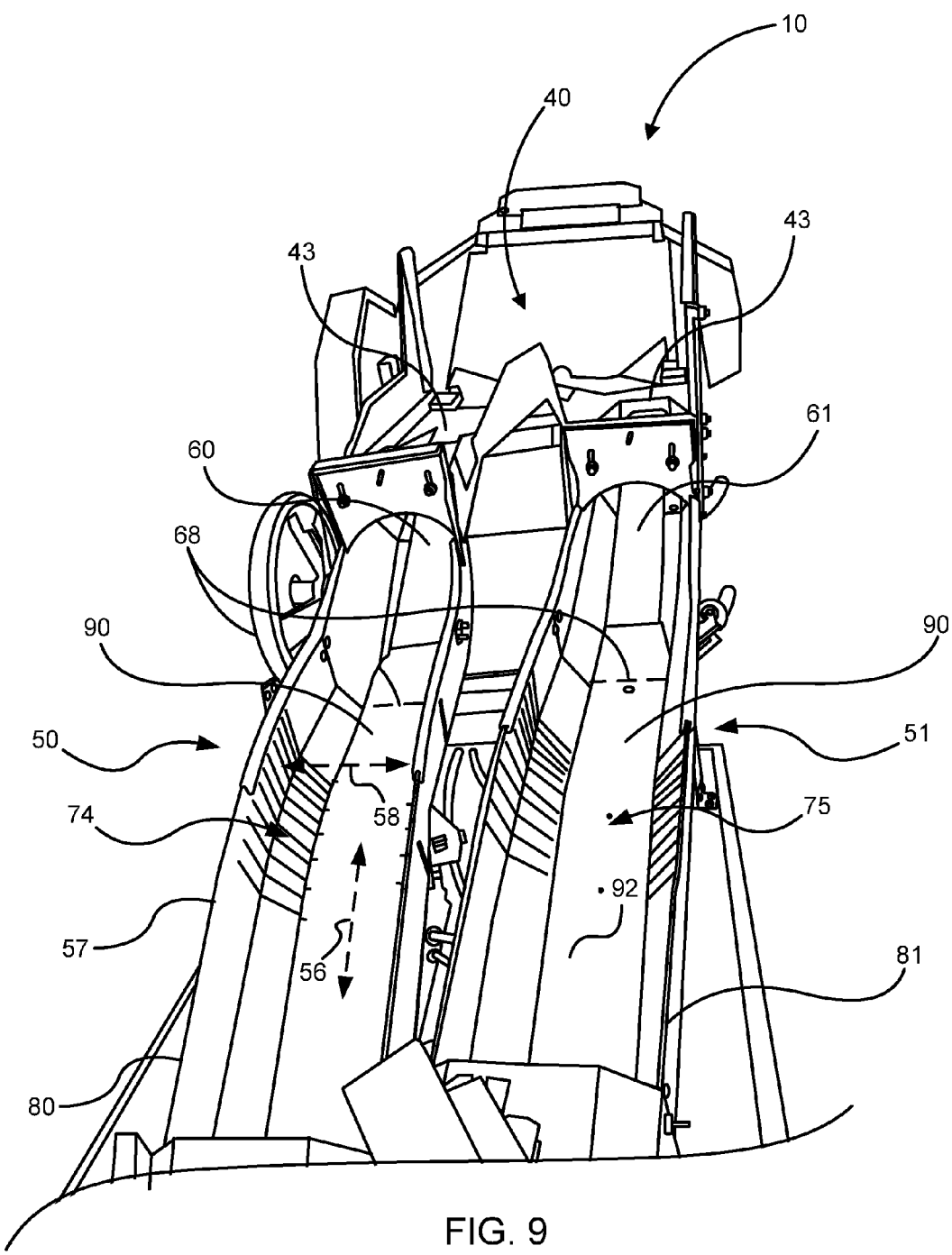
FIG. 9 is a perspective front view of the feed chute and feed channels of the counting apparatus of FIG. 1.

FIG. 9 is a perspective front view of the feed chute 40 and feed channels 50,51 of the counting apparatus 10, and illustrates the placement of a liner 90 over the bottom panels 52 of the feed channels from the start of the feed channel slots 43 formed into the bottom of the feed chute 40, through the choke opening and middle channel portions 60,61, and clear through to the transition channels 74,75 and the ends of the lower channel portions 80,81. The liner 90 can be a removable and/or replaceable insert, and can include a low-friction contact surface 92 for slidably supporting the depositing containers as they slide down the feed channels 50,51. The entire liner 90 can be made from a low-friction type material, such as low-friction plastic, or it can be coated with a slick surface treatment such as wax or a low-friction polymer, etc. In addition, the liner 90 can be configured to provide a smooth, uninterrupted surface while transitioning both the upwardly-curved short-radius bend 68 and at downwardly-curved the long-radius transition channels 74,75.

Also shown in FIG. 9, the feed channels 50,51 can have a width 58 which varies along the length of the feed channels. For instance, the feed channels may widen downstream of the choke opening 66 so as to reduce the possibility of inadvertent contact between the deposit containers and the sidewalls 57 which may knock the deposit containers out of alignment with the longitudinal axes 56 of the feed channels 50,51.

Figure 10:
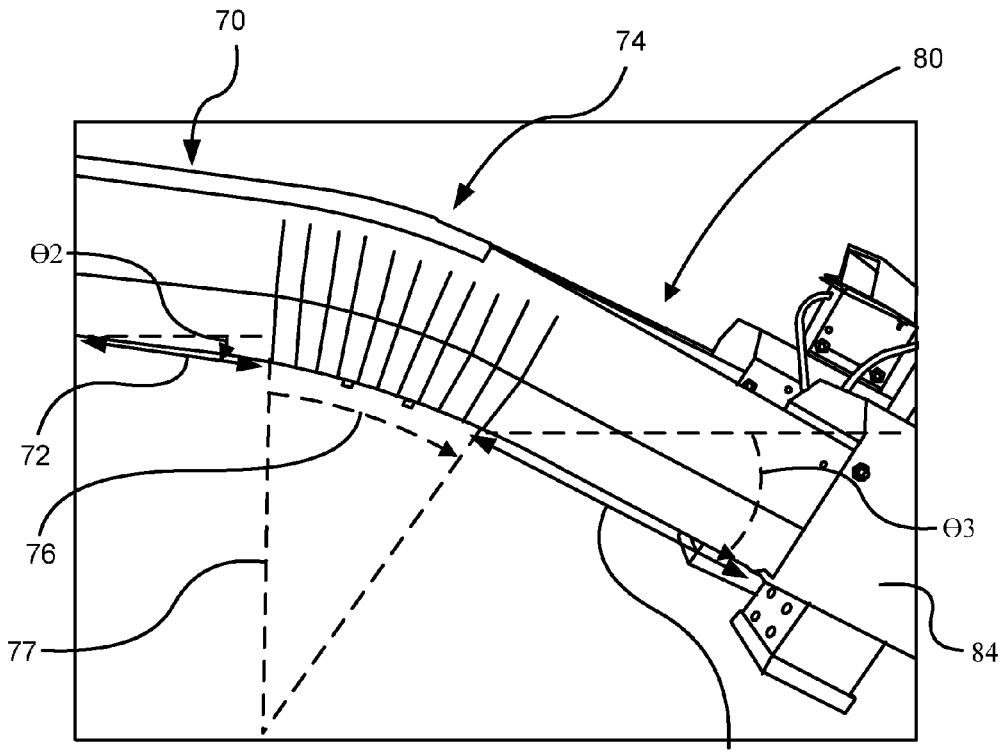
FIG. 10 is a close-up side view of the middle channel portion, the transition channel portion, and the lower channel portion of the feed channel of FIG. 8.

Referring now to FIG. 10, the transition channel portion 74 of feed channel 50 is configured to provide a downward, long-radius transition curve 76 between the middle channel portion 70 and the lower channel portion 80. The transition curve 76 can have a radius 77 that is equal to or greater than the width 58 of the feed channel 50 at the transition channel portion 74 (see FIG. 9), up to about five times or greater than the width 58 of the feed channel 50 at the transition channel portion. Therefore, because the width 58 of the feed channel 50 at the transition channel portion 74 is about four inches, the radius 77 of the long-radius transition curve can thus range from at least about four inches to about twenty inches. In the embodiment of the counting apparatus shown in FIG. 10, the radius 77 of the transition curve 76 is about eighteen inches.

As can be seen in FIG. 10, the lower channel portion 80 is positioned at a third downward slope 82 at a third slope angle θ3 that is more inclined than the second downward slope 72 of the middle channel portion 70. Furthermore, the third slope angle θ3 can be substantially the same as, less than, or greater than the first slope angle θ1 of the upper channel portion 60, and can range from about fifteen degrees to about thirty degrees below horizontal. In a preferred embodiment, moreover, the third slope angle θ3 can range between about twenty-five degrees to about twenty-eight degrees below horizontal.

It is thought that each deposit container is accelerated by the force of gravity as it passes over the downward, long-radius transition curve 76, which acceleration in turn causes the deposit container to separate from the adjacent deposit container which is immediately behind (e.g. above) the deposit container (e.g. lower) undergoing the acceleration. As the lower deposit container continues to move down the steeper slope 82 of the lower channel portion 80 the separation between the two objects will continue to grow, even though the upper deposit container by this time is also passing over the transition curve 76. Consequently, this separation or "singulation" created by the long-radius transition curve 76 can allow for the lower container to pass through the sensor assembly 84 having a sufficient separation from the next adjacent deposit container to ensure accurate counts.

The long-radius transition curve 76 provides the added benefit of controlling the alignment and/or orientation of the deposit container as it passes through the transition channel portion 74 of the feed channel 50, causing the flow of deposit containers to be smoother and more in-line with longitudinal axis of the feed channels. Because the downward change in direction is gradual rather than abrupt, the deposit containers will not become airborne and instead will remain in continuous contact with contact surface of the feed channel's bottom panel or liner insert. This continuous contact can ensure that the long axis of the deposit container remains aligned with the longitudinal axis of the feed channel as the deposit container rounds the transition curve 76 and proceeds down the lower channel portion 80 to reach the sensor assembly 84 located at the far end of the lower channel portion 80.

If not for the continuous contact with the contact surface providing guidance, the deposit container could become airborne after passing over the downward bend and skew out-of-alignment, which on occasion could allow one or both ends of the deposit container to contact a side wall of the feed channel and thereby slow the passage of the lower deposit container enough for the following deposit container to catch up. In this event the two deposit containers could enter the sensor assembly without adequate separation, which may cause the counting apparatus to miscount the two separate deposit containers as a single deposit container.

Figure 11:
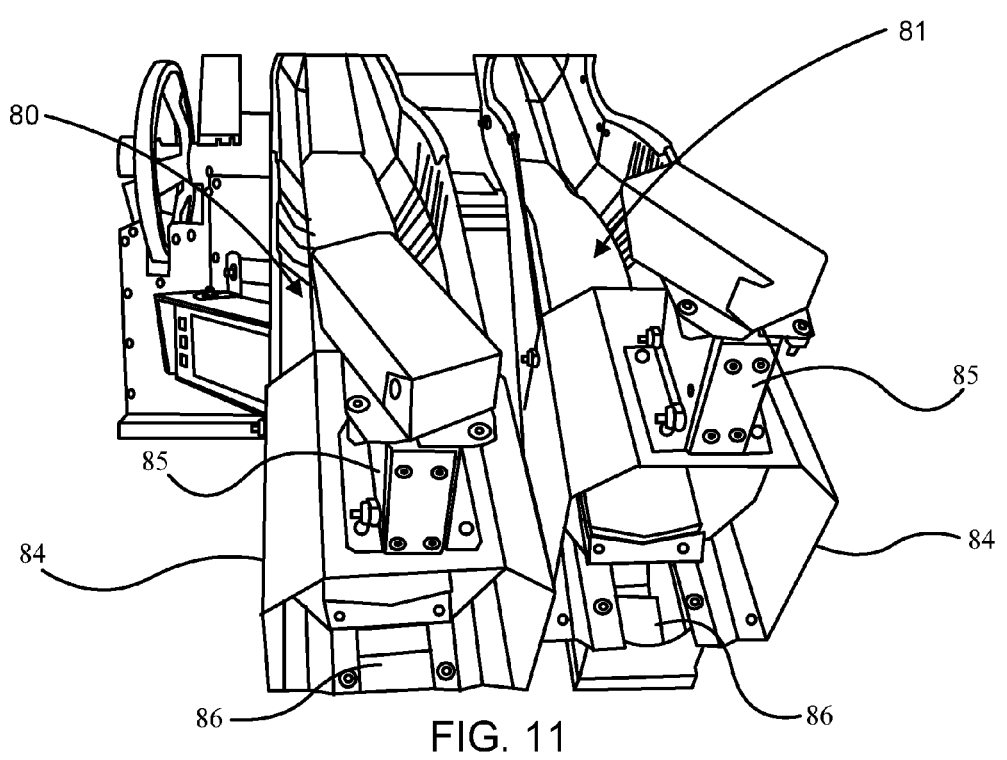
FIG. 11 is close-up front view of the lower channel portion and sensor assembly of the counting apparatus of FIG. 1.

The sensor assembly 84 of the lower channel portion 80 is shown in more detail in FIG. 11. In one embodiment the sensor assembly 84 can include an optical sensor 85 having a light-generating functionality that directs a beam of light across the exit opening of the sensor assembly to strike a reflector 86, which in turn reflects the beam of light back to a light-detector functionality when there is no intervening object to interrupt the light beam's passage. The beam of light can be in electromagnetic wavelengths that are either visible or invisible (e.g. infrared, ultraviolet, etc.) to the human eye. The sensor 85 further supplies an electric signal to an electronic counting device (not shown) each time it senses the reflected beam of light. The electronic counting device then updates the count of objects which have interrupted the beam.

As can be seen in the figure, the orientation of the sensor 85/reflector 87 can be in the vertical plane so as to sense and count any deposit container which passes down the center portion of the feed channel, regardless of its height. Furthermore, and as would be appreciated by one of skill in the art, other types of sensor configurations for sensing the passage of deposit bottles are also possible and may be considered to fall within the spirit and scope of the present invention.

Figure 12:
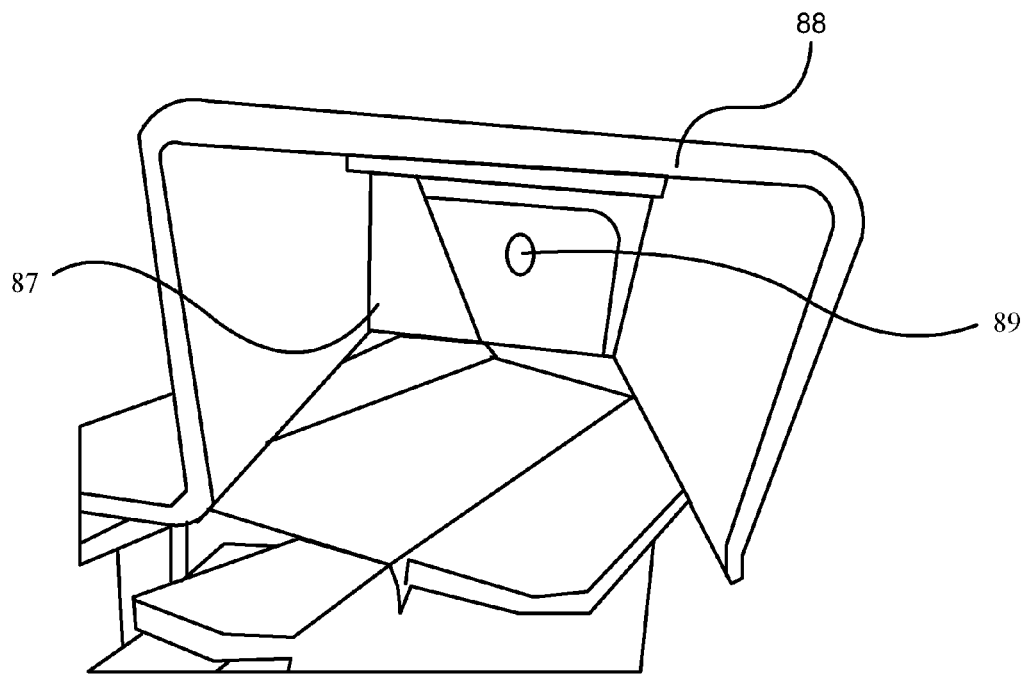
FIG. 12 is a close-up view of a sensor indicator mirror located on the counting apparatus of FIG. 1.

The sensor assembly can also include a visible indication to the user or operator of the counting apparatus as to whether or not the beam of light is currently unobstructed or obstructed, as a check to ensure that the optical sensing components are working correctly. Because of the sensor's vertical installation in the sensor assembly, this indicator light may not be easy to see from the operator's position. Illustrated in FIG. 12 is a housing cover 88 which holds and protects a mirror 87 that reflects an image of the sensor's instantaneous indicator light 89 to the user.

Figure 13:
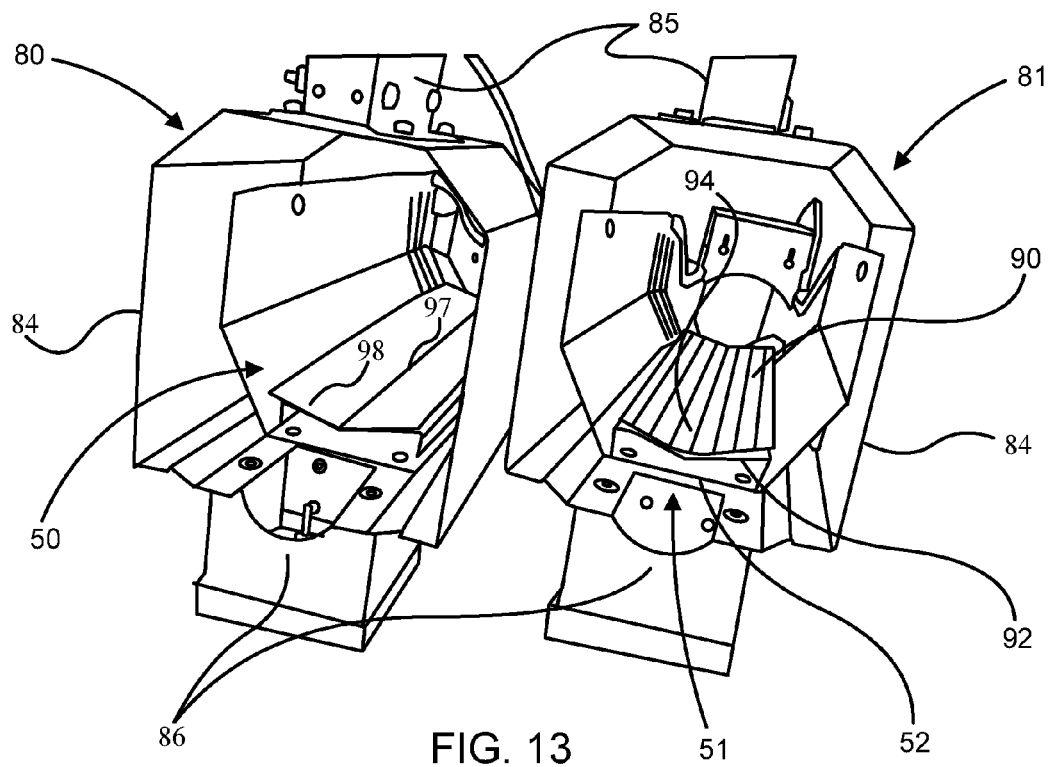
FIG. 13 is an end view of the lower channel portion and sensor assembly of the counting apparatus of FIG. 1.

FIG. 13 is an end view of the lower channel portions 80, 81 and sensor assemblies 84 of the feed channels of the counting apparatus. In addition to the close-up view of the sensor assemblies 84, including the sensors 85 and reflectors 86, FIG. 13 also provides a clear illustration of the liner insert 90 and liner mount 92 which attaches the liner insert 90 to the bottom panels 52 of the feed channels 50, 51.

Figure 14:
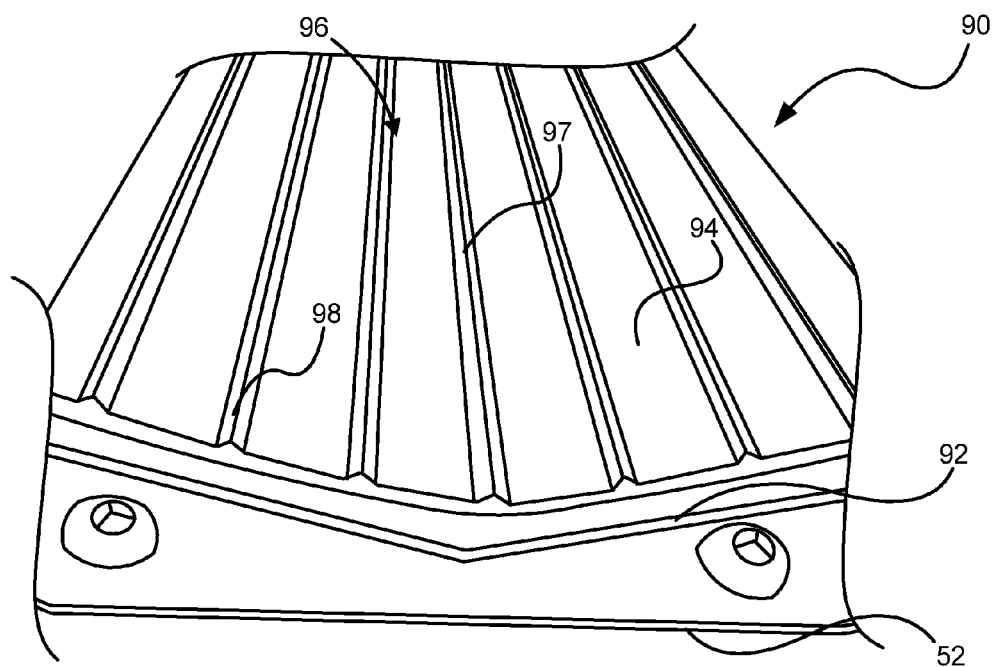
FIG. 14 is a close-up view of a liner insert located on the counting apparatus of FIG. 1.

A close-up view of the liner 90 is provided in FIG. 14. As can be seen, the liner insert 90 can include a V-shaped profile 96 having a center groove 97 that is aligned with the longitudinal axis of the feed channel. This V-shaped profile 96 can be used to guide the long axes of the generally-cylindrical deposit containers into alignment with the longitudinal axis of the feed channel and to maintain that alignment from the choke opening to the sensor assembly.

Also visible in FIGS. 13-14 are a plurality of ribs 98 extending upward from the contact surface 94 of the insert 90 that run parallel with the longitudinal axis of the feed channel 50. The ribs 98 can function to lift the deposit containers off most of the surface area of the contact surface 94 and thereby reduce the total friction-generating contact area between the deposit containers and the liner 90 to a fraction of what it would be otherwise. This allows the deposit containers to travel easily and quickly down the length of the counting apparatus. The ribs 98 also reduce the negative impact of sticky or syrupy residues that are often present on the deposit containers before being loaded into the loading basin for counting, both by facilitating the movement of the deposit containers down the feed channels to the sensor assembly and by limiting the amount of residue transferred to the contact surfaces which could slow subsequent deposit containers moving through the feed channels.

Figure 15:
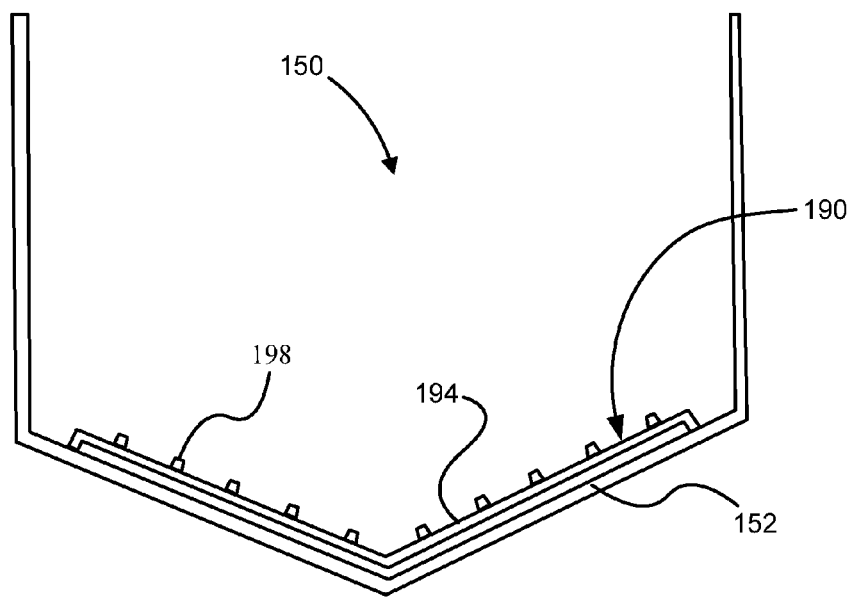
FIG. 15 is a schematic view of a liner insert, in accordance with another embodiment of the present invention.

In the embodiment of the counting apparatus 10 illustrated in FIGS. 13 and 14, a liner mount 92 is used to attach the V-shaped liner 90 to the flat, bottom panel 52 of the feed channel 50. As shown in FIG. 15, however, the liner mount may not be required in other embodiments because the V-shaped liner 190 may be directly attached to the bottom panel 152 of the feed channel 150 which is also V-shaped. As with the embodiment illustrated above, the liner 190 can include both a slick contact surface 194 and ribs 198 running parallel with the longitudinal axis of the feed channel 150. The liner 190 can be attached to the bottom panel 152 with fasteners and the like so as to be removable when necessary, but may also be attached with glue or a similar adhesive to form a more-permanent assembly.

With regard to other features of the counting apparatus, 10, FIG. 16 illustrates the cradle 22 of the loading basin 20 having one or more sets of transverse roller wheels 28 attached to the cradle cross members. These roller wheels 28 can both center the removable bin (see FIGS. 1-3) within the cradle and allow the operator to more easily rotate the removable bin. This rotation, working in conjunction with the angled member 25 shown in FIG. 3*a*, provides for a smoother and more continuous flow of containers out of the removable bin 26, and allows the operator to control the feed rate of containers from the removable bin 26 into the feed chute 40, as described earlier. The wheels also reduce the wear and tear on the loading bins and the cradle hinges.

Figure 17:
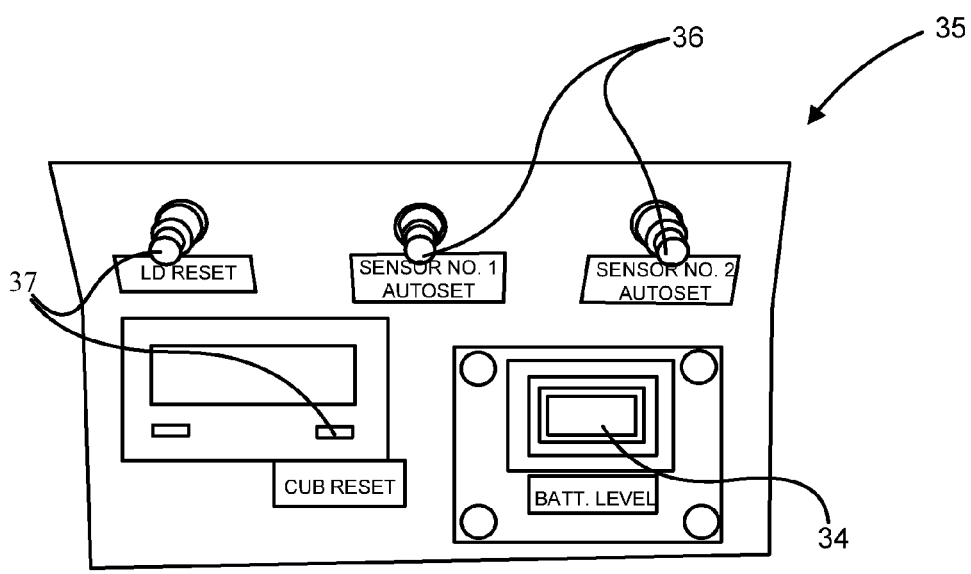
FIG. 17 is a close-up view of the control panel of the counting apparatus of FIG. 1.

The control panel 35 is shown in FIG. 17, and includes a variety of control switches and displays needed to operate the counting apparatus. For instance, the sensor resets 36 can reset one or more electronic counting devices (not shown) which count the impulse signals from the sensor assemblies, and the display resets 37 can reset the deposit container count on the both the small operator display 38 and the large customer display, 39 in FIGS. 1-3. A battery level indicator 34 can also be provided to show the charge status of the battery which powers the optical sensors, the electronic counting device and the two displays.

Illustrated in FIGS. 18-21 are several representative embodiments of a system for handling deposit beverage containers, which embodiments also include one or more methods of automatically counting deposit beverage containers. As described below, the system for handling deposit beverage containers includes various details, components, and modules that may be substantially similar and analogous to previously described components, elements, and modules with reference to FIGS. 1-17.

Figure 18:
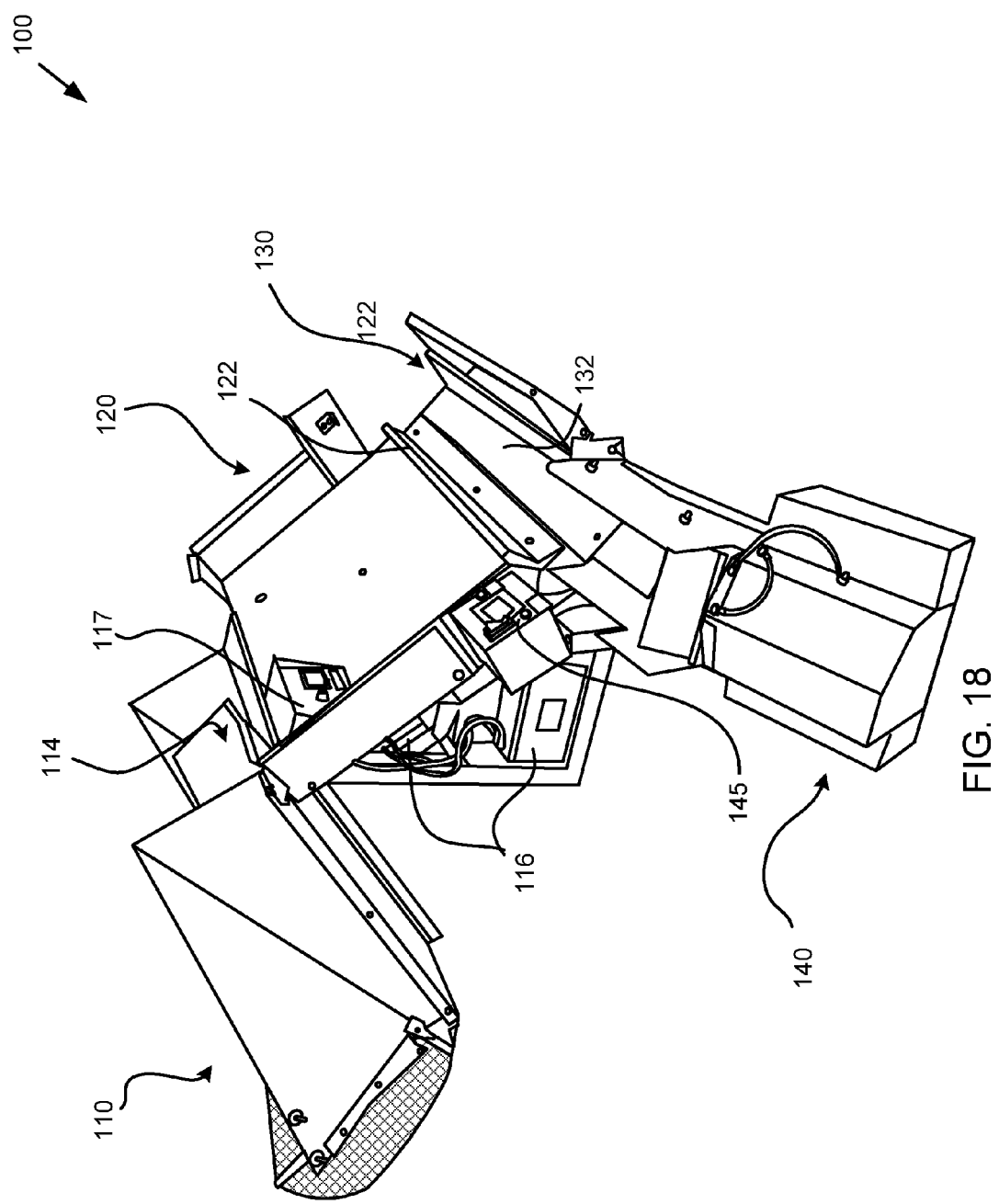
FIG. 18 is a perspective view of a handling system for deposit beverage containers, according to one embodiment.

FIG. 18 is a perspective view of a handling system 100 for deposit beverage containers, according to one embodiment. The system 100 includes a loading assembly 110, a tray 120, a feed channel 130, and a count module 140. The loading assembly 110, which may be similar and analogous to the loading basing 20 described above, is described in greater detail below with reference to FIG. 19. The tray 120 and its various attachments are described below with reference to FIGS. 20 and 21. The feed channel 130 and the count module 140, which may be similar to the feed channel(s) 50 and counting apparatus 84 described above, are also described in greater detail below.

Generally, the system 100 provides an apparatus/device that workers can utilize in handling deposit beverage containers. According to one embodiment, the handling system 100 may be implemented as a customizable device that allows workers/users to select and configure the system between various use-modes. For example, the handling system 100 may be utilized in a sort-only mode, a count-only mode, or a sort-and-count mode. In other words, the loading assembly 110 may be loaded with a single type of deposit beverage container (pre-sorted), in which case no sorting is required and the system may be configured and adapted to be used in a count-only mode. In another embodiment, the loading assembly may be loaded with multiple types of deposit beverage container, in which case the containers may be sorted in a sort-only mode or sorted and counted in a sort-and-count mode. The system 100, especially the tray 120 may be elevated a certain distance from the ground in order to position the tray in a convenient orientation with respect to a seated or standing worker/user. In other words, the system 100 may legs/framework that elevates the system to the proper position. In another embodiment, the entire system may be portable and may be placed on a table or counter.

Figure 19:
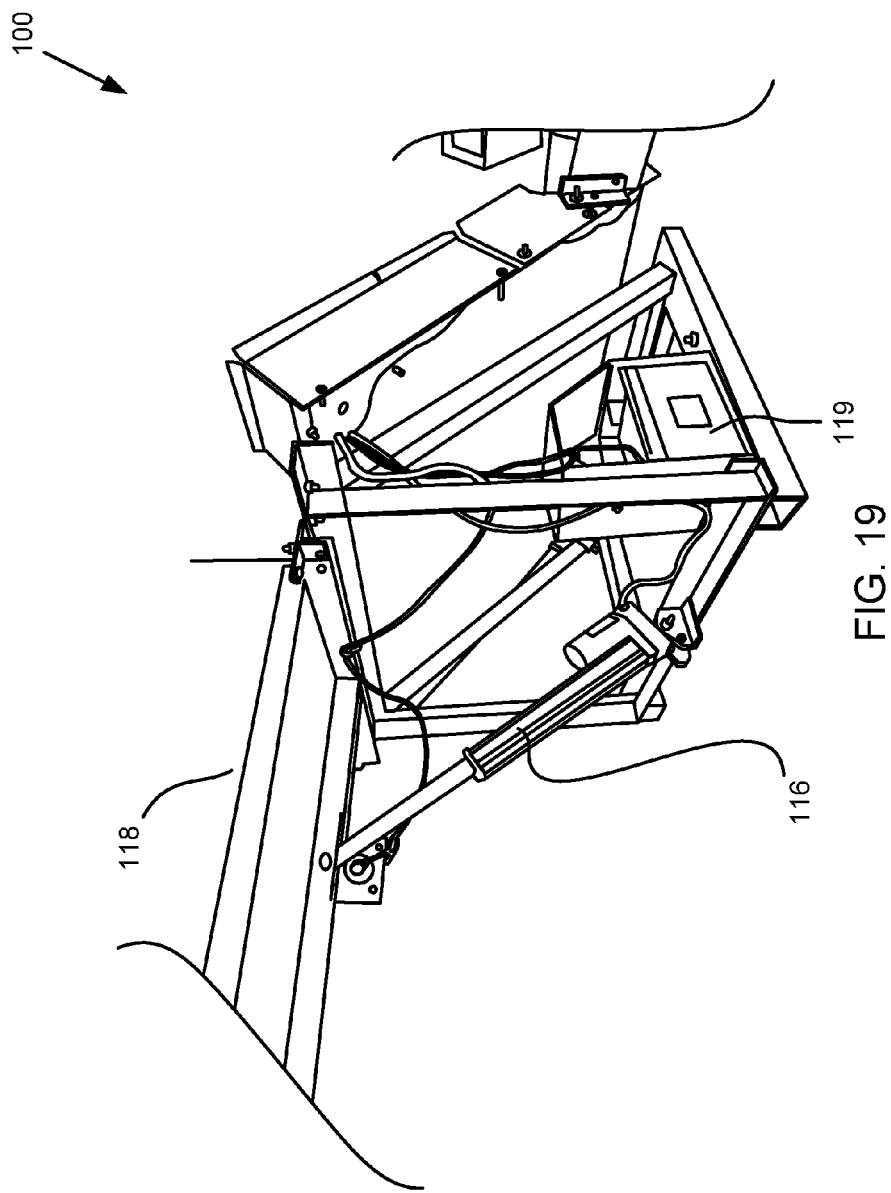
FIG. 19 is a perspective view of a lift actuator for a deposit beverage container handling system, according to one embodiment.

FIG. 19 is a perspective view of a lift actuator 116 of the loading assembly 110 for the deposit beverage container handling system 100, according to one embodiment. Similar to the description above with reference to the loading basin 20, the loading assembly 110 generally holds a plurality of deposit beverage containers for handling. The loading assembly 110 may include a basin 118 (the bottom/exterior of which is shown in FIG. 19, that holds the containers. The basin 118 may be an integrated chamber within which containers may be directly deposited/held or the basin 118 may be a support structure that supports and/or holds a removable bucket/container. In one embodiment (not depicted), the basin 118 may be manually actuated, thus allowing a worker/user to manually lift and lower the basin 118 to various dumping and loading positions, respectively.

In another embodiment, the loading assembly 110 may include a lift actuator 116 that is powered by a battery 119 or other power source. The lift actuator 116 may be programmed to automatically effectuate a dumping procedure via a controller. In another embodiment, a user/worker may manually control the actuation of the lift actuator 116 via an interface 117 (see FIG. 18). The loading assembly 110 may further include other components, such as a vibrator that facilitates the delivery of beverage containers from the basin 118 to the tray 120.

Figure 20:
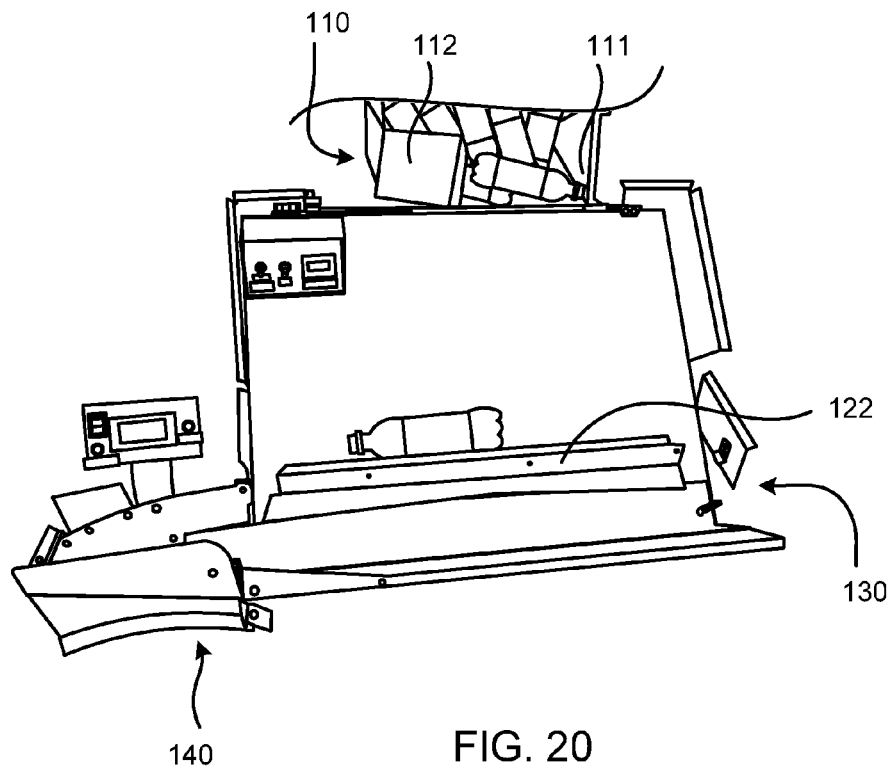
FIG. 20 is a front view of a deposit beverage container handling system showing a tray with a sort bar, according to one embodiment.

FIG. 20 is a front view of a deposit beverage container handling system in a sort-and-count mode showing a tray 120 with a sort bar 122, according to one embodiment. The loading assembly 110 includes an outlet end 111 from where the held beverage containers exit the loading assembly 110 and are received by the tray 120. The outlet end 111 of the loading assembly 110 may include one or more panels 112 that throttle or otherwise restrict the reception of containers on the tray 120, thereby preventing or at least reducing the likelihood of a sudden deluge of containers at once. The tray 120, according to one embodiment, is in a fixed angled orientation with respect to the ground. In another embodiment, the tray 120 may be customized to have different angled orientations with respect to the ground. Such customization may be performed manually or via various mechanical actuators. In one embodiment, the angle of the tray with respect to the ground is between about 10 degrees and 80 degrees. In another embodiment, the angle of the tray 120 with respect to the ground is between about 30 and 80 degrees. In another embodiment, the angle between the tray 120 and the ground is about 65 degrees.

As depicted, the tray 120 may include various side panels that prevent containers from inadvertently sliding off of the tray to one lateral side or the other. The sort bar 122, according to one embodiment, may be detachably coupled to the tray 120, thus allowing a worker/user to swap out the sort bar 122 for a chute 124 (described below), to couple multiple sort bars to the tray 120 at different positions across the surface of the tray 120, to swap out a first sort bar for a second sort bar (i.e., different sorting bars with different dimensional characteristics may be used depending on the type/quantity/dimensions of the beverage containers being handled by the system 100). In one embodiment, the sort bar 122 extends substantially perpendicularly from the surface of the tray 120 and is configured to act as a lip that catches containers falling across the surface of the tray 120 from the outlet 111 of the loading assembly 110. Accordingly, the sort bar 120 temporarily holds individual beverage containers in place while the worker/user sorts the beverage containers.

The count module 140 in the depicted embodiment is coupled to one end of the feed channel 130. In another embodiment, another count module may be coupled to the other end of the feed channel 130. In yet another embodiment, no count modules 140 may be coupled to the feed channel 130 and instead the ends of the feed channel may be routed to/coupled to a holding module (not depicted). The feed channel 130 may be disposed along a bottom edge of the tray 120. In one embodiment, the feed channel 130 is V-shaped and may be made from a low-friction material or at least may have a low-friction liner that facilitates easy sliding of the beverage containers along the channel 130. The feed channel 130 may have features, dimensions, properties, and characteristics that are similar to the feed channels 50 described above. For example, the combination of one end (i.e., a sloped end) of the feed channel 130 and the count module 140 may have the relative curves/slopes as described above that facilitate aligning and separating the containers for individual count. The relative curves/slope may also be partially affected by the slope/curvature of the chute 124.

Figure 21:
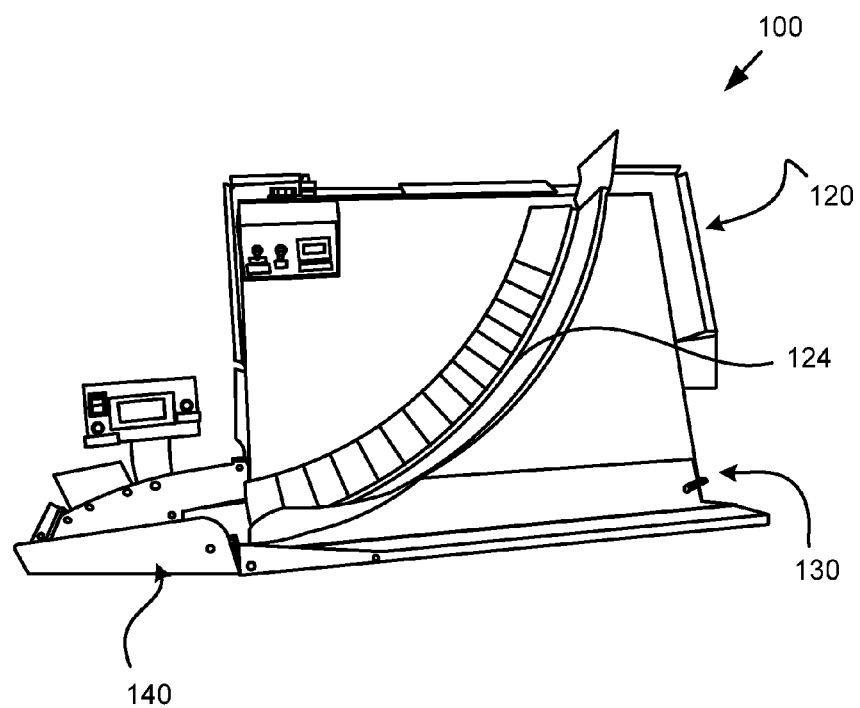
FIG. 21 is a front view of a deposit beverage container handling system showing a tray with a chute, according to one embodiment.

FIG. 21 is a front view of a deposit beverage container handling system in a count-only mode showing a tray 120 with a chute 124, according to one embodiment. The chute 124 may be detachably coupled to the tray 120, thereby allowing a user/worker to operate the system 100 in a count-only mode. Accordingly, the chute 124 attachment provides a pathway/route for the containers to slide across the surface of the tray 120 towards the count module 140. In such an embodiment, the chute may have features, dimensions, characteristics, curvature, and slope that is similar to the feed chute(s) 40 described above. In one embodiment, the chute 124 may substantially bypass the feed channel 130 and may directly route the containers to the count module 140.

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

The subject matter of the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A system comprising:
    a load assembly configured to hold a plurality of deposit beverage containers, the load assembly comprising an outlet end;
    a tray configured to receive the deposit beverage containers from the outlet end of the load assembly, wherein the tray is configurable in the following modes:
        a sort-and-count mode with a sort bar disposed on the tray and configured to stop individual deposit beverage containers from sliding across the tray long enough to allow a user to sort individual deposit beverage containers, and
        a count-only mode with a chute disposed on the tray and configured to direct the deposit beverage containers in a path across the tray; and
    a feed channel disposed along a bottom edge of the tray and configured to receive the deposit beverage containers from the tray, the feed channel coupleable to a count module configured to receive and count the deposit beverage containers from the feed channel.

2. The system of claim 1, wherein the system comprises and the feed channel is coupled to the count module.

3. The system of claim 2, wherein the sort bar and the chute are detachably coupled to the tray, allowing the user to change the system between various use-modes.

4. The system of claim 3, wherein the sort bar and the chute are detachably coupled to the tray exclusive of each other, allowing the user to alternate the system between the sort-and-count mode (sort bar coupled to the tray) and the count-only mode (chute coupled to the tray).

5. The system of claim 4, wherein in the count mode the system comprises a chute that is configured to direct the deposit beverage containers in an arcuate path across the tray to the count module, substantially bypassing the feed channel.

6. The system of claim 2, wherein the feed channel comprises a sloped end portion, wherein the count module comprises:
    a choke opening that orders the deposit beverage containers into a single file row;
    an upward bend following the choke opening that has a decreased slope, when compared to the sloped end portion of the feed channel, to moderate the flow of the deposit beverage containers;
    a downward curve following the upward bend that accelerates each deposit beverage container to create separation between the deposit beverage containers; and
    a sensor following the downward curve configured to count the number of deposit beverage containers.

7. The system of claim 1, wherein the system comprises and the feed channel is coupled to a holding module, the system further comprising the sort bar coupled to the tray in a sort-only mode.

8. The system of claim 1, wherein the load assembly comprises a lift actuator that is controllable by a user to lift and lower the plurality of deposit beverage containers to upward dumping positions and to lower loading positions, respectively.

9. The system of claim 1, wherein the tray is positioned in an angled orientation with respect to the ground.

10. The system of claim 9, wherein the angled orientation of the tray is selectable by a user.

11. The system of claim 1, wherein the tray is elevated a distance above the ground so as to allow a user easy access to the deposit beverage containers received from the load assembly.

12. The system of claim 1, wherein the feed channel comprises a bottom panel having a V-shaped contact surface.

13. The system of claim 1, wherein the feed channel comprises a bottom panel having a low-friction contact surface.

14. The system of claim 1, wherein the feed channel comprises a bottom panel having a low-friction liner insert.

15. The system of claim 1, wherein the feed channel comprises a bottom panel having a plurality of protruding ribs, the protruding ribs being aligned with the longitudinal axis of the feed channel.

16. The system of claim 1, wherein the load assembly comprises a vibrator that facilitates controlled delivery of deposit beverage containers from the load assembly to the tray.

17. A system comprising:
a load assembly configured to hold a plurality of deposit beverage containers, the load assembly comprising an outlet end;
a tray configured to receive the deposit beverage containers from the outlet end of the load assembly, the tray having one or both of the following components detachably coupled thereto:
a sort bar configured to stop individual deposit beverage containers from sliding across the tray long enough to allow a user to sort individual deposit beverage containers, and
a chute configured to direct the deposit beverage containers in a path across the tray; and
a feed channel configured to receive the deposit beverage containers from the tray, the feed channel disposed along a bottom edge of the tray; and
a count module coupled to an end of the feed channel and configured to receive and count the deposit beverage containers from the feed channel.

18. The system of claim 17, further comprising a second count module coupled to a second end of the feed channel.

19. A system comprising:
a load assembly configured to hold a plurality of deposit beverage containers, the load assembly comprising an outlet end, a lift actuator that is controllable by a user to lift and lower the plurality of deposit beverage containers to one or more upward dumping positions and to one or more lower loading positions, respectively, and a vibrator;
a tray configured to receive the deposit beverage containers from the outlet end of the load assembly, wherein the tray is elevated a distance above the ground so as to allow a user easy access to the deposit beverage containers;
a sort bar coupled to the tray and configured to stop individual deposit beverage containers from sliding across the tray long enough to allow the user to manually sort the individual deposit beverage containers;
a feed channel configured to receive the deposit beverage containers from the tray, the feed channel disposed along a bottom edge of the tray, the feed channel comprising a bottom panel having a V-shaped contact surface; and
a count module coupled to an end of the feed channel and configured to receive and count the deposit beverage containers from the feed channel.

20. The system of claim 19, wherein the feed channel comprises a sloped end portion, wherein the count module comprises:
a choke opening that orders the deposit beverage containers into a single file row;
an upward bend following the choke opening that has a decreased slope, when compared to the sloped end portion of the feed channel, to moderate the flow of the deposit beverage containers;
a downward curve following the upward bend that accelerates each deposit beverage container to create separation between the deposit beverage containers; and
a sensor following the downward curve configured to count the number of deposit beverage containers.

* * * * *